Nov. 6, 1962

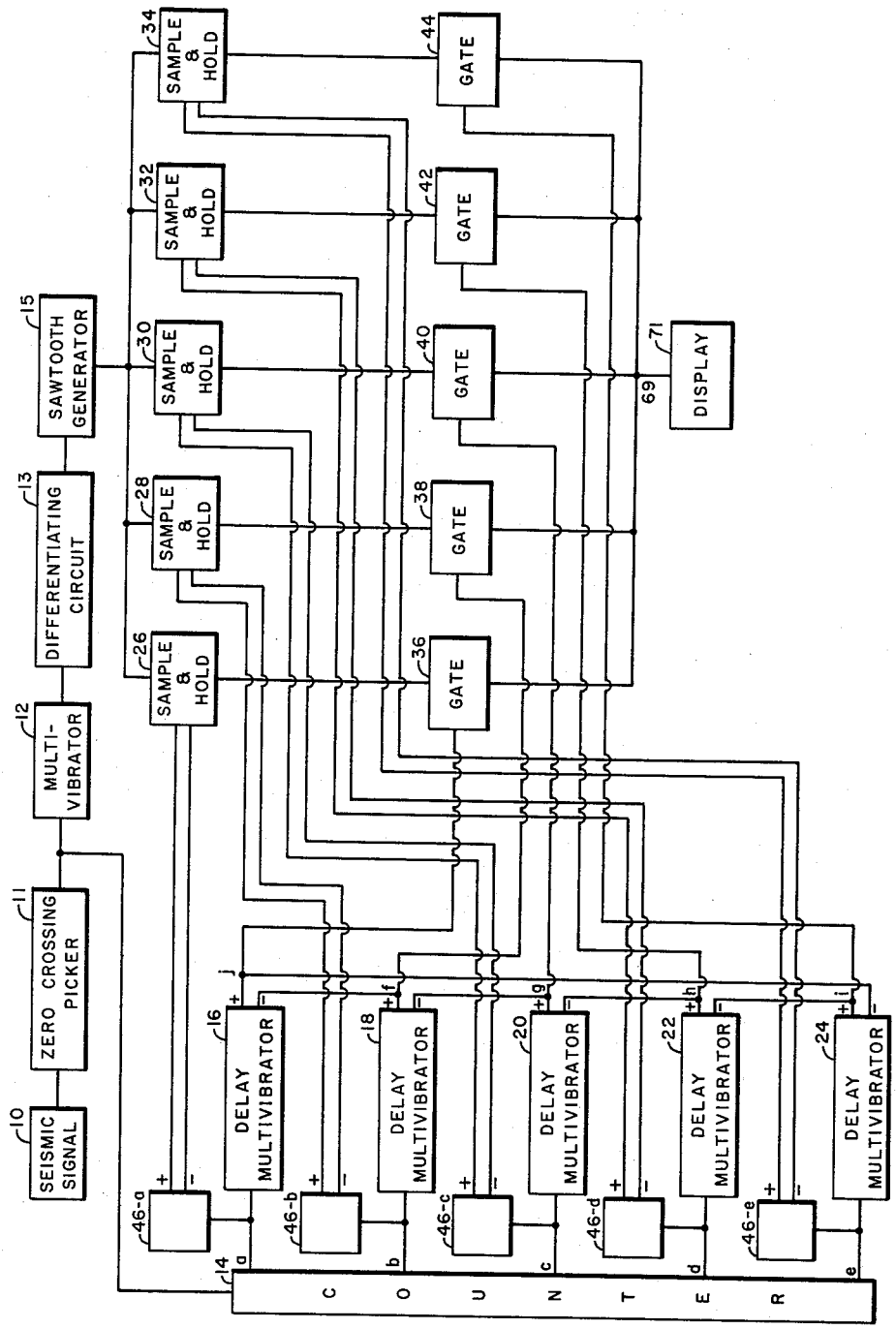

J. L. SHANKS 3,063,014

CIRCUIT RESPONSIVE TO INPUT WAVE ZERO
CROSSINGS PRODUCING RECTANGULAR
PULSES OF AMPLITUDE

Filed Aug. 3, 1959

John L. Shanks  Inventor

By John D. Gassett  Attorney

John L. Shanks  Inventor
By John D. Gassett  Attorney

United States Patent Office 3,063,014
Patented Nov. 6, 1962

3,063,014
CIRCUIT RESPONSIVE TO INPUT WAVE ZERO CROSSINGS PRODUCING RECTANGULAR PULSES OF AMPLITUDE
John L. Shanks, Tulsa, Okla., assignor to Jersey Production Research Company, a corporation of Delaware
Filed Aug. 3, 1959, Ser. No. 831,248
9 Claims. (Cl. 328—28)

The present invention pertains to an improvement in systems for recording a seismic signal. The invention especially pertains to a seismic recording system which makes use of frequency information of the seismic signals.

Geophysical prospecting using artificially induced seismic disturbances has found wide application in the search for petroleum and other products. It is the general practice to initiate an explosion or other seismic disturbance at a point near the surface of the earth to direct seismic waves downward into the earth from that point. The waves continue to travel downward within the earth, until they encounter discontinuities in the earth's structure in the form of various strata, formations and the like. These discontinuities have the effect of reflecting at least a portion of the seismic waves backed toward the surface of the earth. By arranging a plurality of seismic transducers or geophones at spaced distances from the seismic disturbance point, it is possible to detect the arrival of the reflected seismic waves at the surface of the earth. These detected waves are translated into electrical impulses which are then indicative of the character of the ground motion and are usually referred to collectively as a seismic signal which is in effect a composite signal made up of a plurality of electrical signals varying in frequency and amplitude. The electrical signals oscillate across a no signal, zero voltage or a record base line.

The usual practice has been to examine the amplitude characteristics of the recording made of the seismic signals by correlating the amplitudes of a plurality of traces on a seismic record. The seismic computer can then obtain information as to the depth and shape of reflected surfaces.

In the past it has been the general practice to amplify the seismic signals generated by geophones and to record the signal by means of a suitable camera. The camera may take the form of a recording oscillograph or as is more recently the case it may take the form of a magnetic or photographic recording device capable of recording a signal in reproducible form. It is this amplified record signal which seismic computers study.

Most conventional seismographs, that is devices for recording the seismic signals, are capable of recording up to 24 or more separate seismic signals simultaneously. Thus, if a seismic observation results in 24 seismic signals being generated at as many detection stations, the resulting seismograph is a 24-trace record of the resulting 24 signals. The traces are usually arranged in a side-by-side manner; and a timing trace indicating predetermined time intervals is simultaneously recorded with the seismic signals to indicate the amount of time along each trace. Once a seismograph has been made, persons skilled in the art are generally able to determine from the data recorded on the seismograph certain characteristics of the earth's substrata in the vicinity of the seismic observation.

The accuracy of exploration by seismic method depend to a large extent upon the ability of an observer to analyze recorded seismic information. It has been found that variable density records in which the signal of the photographic trace varies in intensity along its length in proportion to the density of the signal are more easily analyzed than other types of record.

There are various known means of producing variable density photographic records. One such system is described in U.S. Patent No. 2,769,683, patented on November 6, 1956, entitled, "Variable Density Recording of Galvanometer Motion," by Jesse D. Skelton. However, the systems for recording seismic information may not readily reflect changes in the frequency in the recorded seismic signal. This shortcoming has developed into a disadvantage inasmuch as it has now been observed that changes in record frequency, that is frequency of a seismic signal, are related to subsurface conditions which may have a bearing on petroleum or other mineral exploration. This shortcoming is overcome in the present invention which provides a system in which the frequencies of a seismic signal may be recorded in a variable density or variable color form.

The overall or average frequency of the record is influenced by, among other things, attenuation of the seismic signal in a subsurface formation. High frequencies are attenuated more than low frequencies, so that the recorded frequency tends to diminish with increasing time after the shot; i.e., as received wave will have to travel farther. Since this effect varies from one earth material to another, a change in frequency may indicate a transition from one type of material to another, that is, from a shale-sand sequence to limestone. This effect may also show up in the change in frequency in a particular depth section going from record to record on a line which may indicate a lateral change in lithology in a section.

The present invention is concerned with a system for detecting frequency changes in seismic signals, that is, the rate a seismic signal crosses a zero base line and then displaying this information as a variable density record in which the intensity of the record is a function of the frequency. By studying the frequency changes with respect to time of a number of correlated records, valuable subsurface information can be obtained, such as velocity, porosity, bed thickness, slope, dip extent of various formations, etc.

Briefly, in a preferred embodiment, this invention includes a system for generating voltage levels proportional to the half-cycle breadths of a seismic waveform. The output presented is a rectangular waveform, each voltage segment thereof being proportional to and of the same time duration as the particular half-cycle breadth represented.

At this point it is well to note that several terms in this description are assumed to have the following meaning. Thus, the term "frequency" is meant to be the number of times the signal waveform or seismic signal crosses the zero signal axis per unit of time. The term "zero crossing" refers to the crossing of the zero signal axis by the signal waveform.

A fuller understanding of this invention may be had by referring to the following description and claims taken in conjunction with the accompanying drawing in which:

FIG. 1 depicts schematically an electronic system which can be utilized in the practice of this invention;

Figure 4:
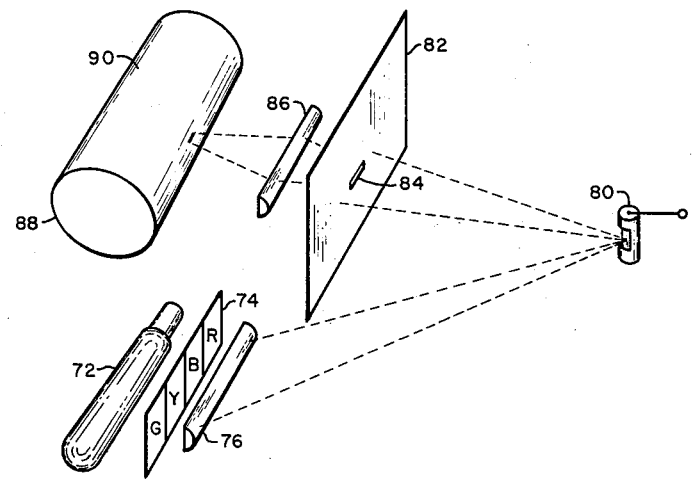

Referring first to FIG. 1, numeral 10 represents a seismic signal or source with amplification. This source may include any reproducible recording of a seismic signal such as a magnetic recording medium or the seismic signal may be taken directly from a geophone and amplified. It is contemplated that reproduced signals produced from reproducible trace recordings will be used with this invention more frequently than signals taken directly from a geophone. The seismic signal is essentially sinusoidal as illustrated at curve 3A in FIG. 3. The seismic signal is fed to a zero crossing picker 11. This zero crossing picker generates a sharp pulse of short duration for each zero crossing. Such zero crossing pickers are well known in the art, one such picker being described in Waveforms published by McGraw-Hill Book Company of New York in 1949 on pages 352 to 356.

The output signal from zero crossing picker 11 is fed to a monostable multivibrator 12 and to a counter 14. One shot multivibrator 12 is triggered upon receiving the sharp pulse from zero crossing picker 11. The pulse of multivibrator 12 has a duration preferably of about 2 milliseconds for a frequency range of from about 10 cycles per second to about 100 cycles per second which is the normal range of interest in seismic prospecting. The positive output pulse from multivibrator 12 is fed to a differentiating circuit 13 which is described in Waveforms, supra, p. 649. The output of item 13 is fed to saw-tooth generator 15. The saw-tooth generator is of a character to generate a constant linearally rising voltage upon being energized by a sharp positive pulse from differentiating circuit 13. Upon receiving an indication from zero crossing picker 11, delayed through multivibrator 12, saw-tooth generator 15 is reset to zero voltage and again starts generating its linearly rising voltage.

Figure 2:
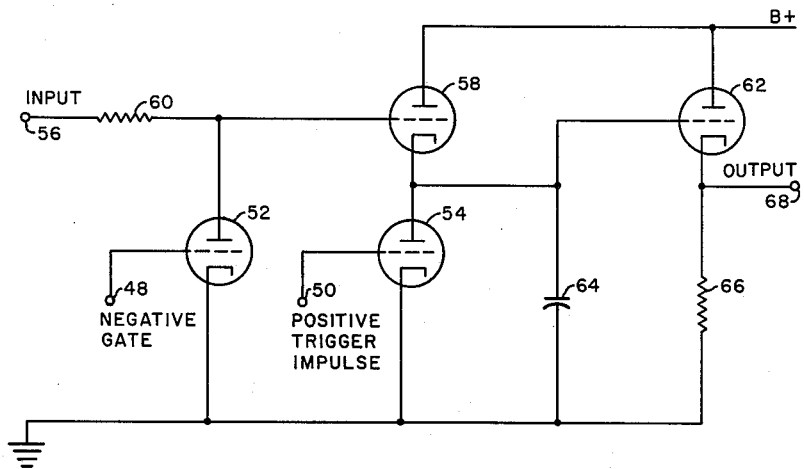
FIG. 2 is a circuit diagram of a sample-and-hold circuit suitable for use in the apparatus of FIG. 1.

The output of saw-tooth generator 15 is electrically connected to sample-and-hold circuits 26, 28, 30, 32 and 34. Each of these sample-and-hold circuits are identical to the others. Attention is now directed to FIG. 2 which illustrates an electrical circuit of the sample-and-hold circuit. As can be seen from FIG. 2, each voltage sampling circuit employs four triodes, two resistors and a capacitor. Two of these triodes, triodes 52 and 54, could readily be replaced by diodes in appropriate controlled circuitry. Transistors might also be employed in place of electron tubes. The sampling action is activated by the simultaneous application of the positive and the negative gate pulses from the multivibrator connected to the circuit. The triggering impulses are fed to positive gate terminal 50 and negative gate terminal 48 in the sampling circuit.

The input signal to be sampled by the sampling circuit shown in FIG. 2 of the drawing is fed to the sample-and-hold circuit through terminal 56. Prior to the arrival of the input signal, triodes 54 and 58 are held cut off, triode 54 by the positive gate signal applied at terminal 50 and triode 58 by the drop across resister 60 caused by current flow through triode 52. Triode 62 provides a low-impedence replica of the voltage on storage condenser 64. When the input signal of the sample arrives at the sampling circuit, triode 52 is cut off, allowing the voltage on the grid of triode 58 to rise to the level of the input signal. Simultaneously, triode 54 is turned on providing a cathode resister for triode 58. Storage capacitor 64 is therefore charged to the new signal level. Immediately after the sample is stored on capacitor 64, triode 52 is turned on and triode 54 is cut off. This leaves capacitor 64 free, holding the grid of triode 62 at signal level. Triode 62 with cathode resister 66 provides a low-impedance output source at terminal 68 for the storage capacitor signal. It will be understood that the sampling circuit thus described is merely representative of circuitry useful in practicing a method of this invention and that the method is not limited to use of any particular sample-and-hold circuit. A number of other sample-and-hold circuits which might be employed in apparatus of the invention with minor and obvious modifications are described in Chapter 14 of Waveform by Chance et al., volume 19 of the Massachusetts Institute of Technology, Radiation Laboratory Series, published by the McGraw-Hill Book Company of New York.

Attention is now directed back to counter 14 which is electrically connected to the output of zero crossing picker 11. The counter, as illustrated, has five outputs, $a$ through $e$ inclusive, which are sequentially energized by the pulses from zero crossing picker 11. That is, output $a$ is energized for the first pulse received, output $b$ is energized for the second pulse received, etc. Only one output of counter 14 is energized at any one time and each individual output is energized by every fifth pulse from zero crossing picker 11. Suitable counters are commercially available. One such counter is sold by Baird-Atomic, Inc., 33 University Rd., Cambridge 38, Massachusetts, and designated GS10C. It is to be understood that the counter 14 may have various numbers of outputs. The number of output will depend primarily upon the frequency of the signal being analyzed. The number of sample-and-hold circuits 26, etc. will be the same as the number of outputs of counter 14 and the same number of delay multivibrators 16 etc. and multivibrators 46a, etc.

Outputs $a$ through $e$ inclusive of counter 14 are electrically connected individually to a one-shot multivibrator 46, $a$ through $e$ respectively. Items 46a through 46e inclusive are identical one-shot multivibrators with each multivibrator having two outputs which are triggered by receiving the pulse from its respective output of counter 14. Each multivibrator has two outputs whose output signals are identical and simultaneous pulses of equal magnitude but of opposite polarity. The negative signal from multivibrator 46a is fed through the contact 48 to triode 52 (FIG. 2). The positive pulse from multivibrator 46a is fed to contact 50 which connects to the grid of triode 54 (FIG. 2). This connection or circuitry is, of course, repeated for the other outputs $b$, $c$, $d$ and $e$ of counter 14 to sample-and-hold circuits 28, 30, 32 and 34, respectively.

Outputs $a$ through $e$ respectively of counter 14 are also connected individually to delay, or monostable, multivibrators 16, 18, 20, 22 and 24, respectively. Multivibrators 16, 18, 20, 22 and 24 may be similar to multivibrator 46a through 46e but have pulses of greater duration. The monostable multivibrators 16, 18, 20, 22 and 24 are of a character that upon receiving an input pulse from its corresponding output of counter 14 each such multivibrator generates a positive and a negative pulse at the two outputs of the multivibrator. These two pulses are equal in time duration and occur simultaneously. The pulses generated by multivibrators 16, 18, 20, 22 and 24 all have the same duration but, of course, do not occur simultaneously. The duration of the pulses is determined by the longest half-cycle breadth to be measured. Duration should preferably be approximately 5% longer than the longest half-cycle breadth. Stated differently the half-cycle breadth of the lowest frequency divided by the number of counter outputs determines rather closely the half-cycle breadth of the highest frequency that device can analyze. A device for processing a signal having a specified frequency content can be made by properly selecting the number of outputs of counter 14 and then having a like number of corresponding gates (36), sample-and-hold circuits (26), delay multivibrators (16) and one-shot multivibrators (46a). Circuitry is provided as indicated in the drawing such that the negative output of multivibrator 16 is added to the positive output of multivibrator 18 at junction means $f$, the negative output of multivibrator 18 is added to the positive output of multivibrator 20 at junction means $g$, the negative output of multivibrator 20 is added to the positive output of multivibrator 22 at junction means $h$, the negative output of multivibrator 22 is added to the positive output of multivibrator 24 at junction means $i$, and the negative output of multivibrator 24 is added to the positive output of multivibrator 16 at junction means $j$. Suitable delay multivibrators are known in the art, one such multivibrator is described in Waveforms, supra, pages 166 to 171.

Junction means *f* is electrically connected to gate 38, junction means *g* to gate 40, junction means *h* to gate 42, junction means *i* to gate 44 and junction means *j* to gate 36. The output of sample-and-hold circuit 26 is fed to gate 36, the output of sample-and-hold circuit 28 to gate 38, the output of sample-and-hold circuit 32 to gate 42 and the output of sample-and-hold circuit 34 to gate 44. The gating device has two inputs for receiving input signals and is of a character to pass the input signal when the sum of such signals reaches a predetermined level. A suitable gating circuit is described in Waveforms, supra, paragraph 9.5, pages 331 to 333. It will be noted hereafter that at any one time only one of the gates will be passing a signal but there will always be one of the gates open. In other words, a continuous signal will be added together at junction 69. The output signal from the gates are added at junction 69 and are then fed to a display mecanism 71.

Attention is next directed toward FIG. 4 which schematically illustrates a display mechanism. It includes a light source 72, a color wedge 74, a condensing lens 76, a reflecting galvanometer 80, a light shield 82, a rectangular apperature 84, a condensing lens 86 and a recording drum 88 having a photo-sensitive medium 90 thereon. Light source 72 is preferably a uniform line light source. Between galvanometer 80 and light source 72 are color filter 74 and a condensing lens 76. Color wedge 74 may be a prism, a series of different colored film or any other means of obtaining various desired colors. In the color wedge shown *r* stands for red, *b* for blue, *y* for yellow and *g* for green. It is of course understood that any desire to color scheme or arrangement may be made. Condensing lens 76 is positioned between light source 72 and galvanometer 80 and is of a character to focus the line light source on reflecting galvanometer 80.

Galvanometer 80 is electrically connected to junction means 69 at which the outputs of gates 36, 38, 40, 42 and 44 are added. The position of the mirror of galvanometer 80 is representative of the signal thus fed. Spaced from galvanometer 80 is light shield 82 having apperature 84. Apperature 84 is preferably a narrow slit that is positioned to receive light reflected from mirror of galvanometer 80. However, only a small amount of the light will pass through apperature 84 depending upon the position of the mirror of galvanometer 80. A condensing lens 86 focuses the light passing through apperature 84 onto a color-sensitive film 90 on drum 88. During operations drum 88 revolves at a constant speed. It is thus believed clear that the color recorded upon color-sensitive film 90 is dependent upon the position of the mirror of galvanometer which is dependent upon the signal fed thereto.

Figure 3:
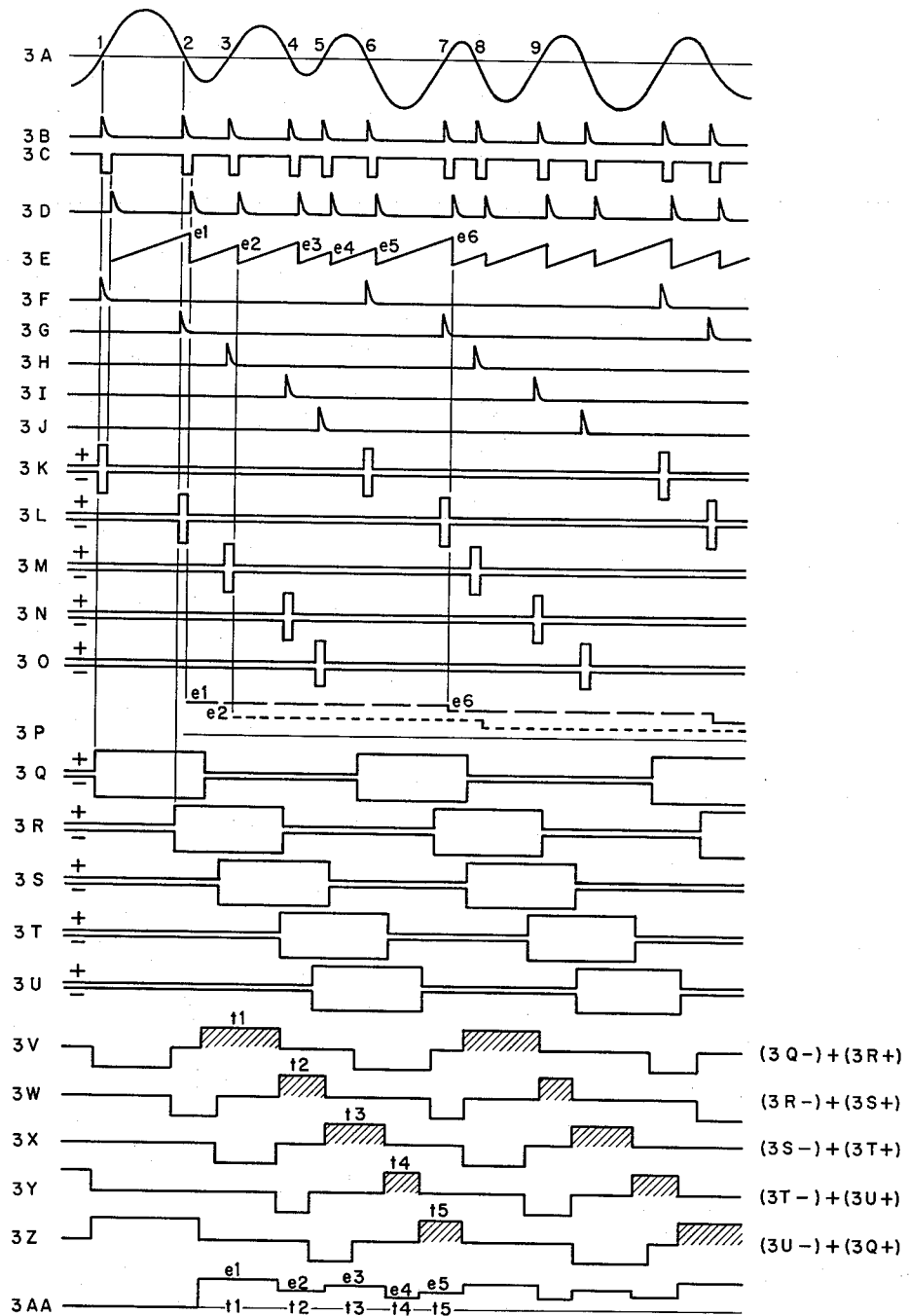
FIG. 3 is a graphic representation of waveforms produced from the input signal during the operation of the system of FIG. 1; and, FIG. 4 illustrates one means of presenting the waveform in variable color.

Attention will now be directed especially toward FIG. 3 for an explanation of the operation of the apparatus illustrated in FIG. 1 and elaborated upon in parts in FIGS. 2 and 4. The relative time of occurrence of the curves illustrated in FIG. 3, and identified as 3A through 3AA, are the same; that is, the curves are aligned vertically to illustrate the time relationship of the occurrences of the various waveforms illustrated thereon. A seismic signal, illustrated in FIG. 3 as curve A is fed through zero crossing picker 11. Zero crossing picker 11 has an output comprising a series of equal amplitude spikes illustrated in curve 3B of FIG. 3 which occur at the zero crossing of the seismic signal. In other words, for each zero crossing of the seismic signal a positive spike or pulse is generated.

The signal represented by curve 3B is fed to counter 14 and also to monostable multivibrator 12. The output of monostable multivibrator 12 is illustrated in curve 3C; this is the negative output thereof and the positive output is not used. The signal illustrated in 3C is fed to differentiating circuit 13 which generates a signal illustrated in curve 3D. It will be noted that the spike is formed at the end of the trailing edge of the square pulse of curve 3C. The curve 3C has a duration preferably of approximately two milliseconds. The output signal 30 from differentiating circuit 13 is fed to sawtooth generator 15. Saw-tooth generator 15 generates a saw-tooth signal such as illustrated in curve 3E. Curve 3E is a saw-tooth waveform which has a constant linearally rising voltage with time and is reset to zero at each spike of curve in 3D. The saw-tooth waveform illustrated in curve 3E is fed to sample-and-hold circuits 26 through 34. More specifically the saw-tooth waveform is fed to junction 56 of the sample-and-hold circuit illustrated in FIG. 2; it is to be remembered that there are five such circuits illustraaed and each circuit receives the saw-tooth input as indicated above.

Attention is next directed to counter 14 which has also been fed curve 3B. Curve 3F is the output signal from output *a* of counter 14 and is a series of spikes which represent the first and every fifth zero crossing thereafter, in other words, the first spike of curve 3F represents zero crossing 1 and the second spike represents zero crossing 6 of the seismic signal 3A. Output *b* of counter 14 has a signal illustrated in 3G, output *c* has a signal output illustrated in 3H, output *d* has a signal output illustrated in 3I and *e*'s output is illustrated in 3J.

The signals represented by curves 3F through 3J are each fed to two separate circuits, one branch through monostable multivibrators 46*a* through 46*e* respectively and the other branch through delay multivibrator circuits 16, 18, 20, 22 and 24 respectively. First, the shapes of the curves will be considered in connection with monostable multivibrators 46*a* through 46*e*. Curve 3K represents the output of monostable vibrator 46*a*. It is seen that upon receiving the sharp pulse of FIG. 3F indicative of the first zero crossing that a positive pulse and a negative pulse are generated which have a constant width and constant and equal amplitude but of different polarity. A separate pulse occurs for each spike of curve 3F. The duration of the pulses in 3K through 3O is preferably about two milliseconds and are of approximately the same time duration as the pulses illlustrated in FIG. 3C; this permits the sample-and-hcld circuit to sample the approximate peak of the saw-tooth waveform in FIG. 3E. Monostable multivibrators 46*b*, 46*c*, 46*d* and 46*e* have poutput signals similar to 3K except as to time of occurrence and are illustrated in 3L, 3M, 3N and 3O respectively. For example of the fuction of the signals of multivibrators 46*a*, etc., the positive curve of curve 3K is fed to the positive trigger impulse junction 50 of the sample-an-hold circuit illustrated in FIG. 2 and the negative output illustrated in curve 3K is fed to the negative gate junction 48. It is during the duration of each pulse that sample-and-hold circuit 26 samples the value of the sawtooth waveform illustrated in curve 3E.

The signals represented by curves 3F, 3G, 3H, 3I and 3J are also fed to delay multivibrators 16, 18, 20, 22 and 24 respectively. The output of delay multivibrators 16, 18, 20, 22 and 24 are represented by curves 3Q, 3R, 3S, 3T and 3U respectively. Referring to curve 3Q it is seen that there are two signals from delay multivibrator 16 which are of constant amplitude and constant width but are of a different polarity. The duration of the pulses are constant and are preferably approximately 5% greater than the greatest time duration between successive zero crossings to be considered. The occurrences of these pulses are controlled by the pulses illustrated in 3K which controls the occurrences of the pulses illustrated in 3Q and the pulses of curves 3L, 3M, 3N and 3O control the occurrence of the pulses shown in 3R, 3S, 3T and 3U respectively.

As previously described, the negative signal from multivibrator 16 is added to the positive output of multivibrator 18. This addition is illustrated in FIG. 3 in which the negative pulses of curve 3Q are added to the positive pulses of curve 3R. The resulting curve or signal is illustrated in curve 3V. The negative pulses of 3R are added to the positive pulses of curve 3S and are illustrated in curve 3W; the negative curve 3S is added to the positive curve 3T and is illustrated by curve 3X. The negative pulses of curve 3T are added to the positive pulses of curve 3U and the resulting curve is illustrated in curve 3Y and the negative pulses of curve 3U are added to the positive pulses of curve 3Q and the resulting signal is illustrated in curve 3Z.

Referring to curve 3V the pulses which are sufficient to gate or open gate 38 are illustrated by the shaded area. The first shaded area in curve 3V has a time duration $t_1$. $t_1$ is equal in duration to the time between zero crossing 1 and 2 illustrated in curve 3–A. During the occurrence of the first gating pulse in curve 3V the sampled voltage $e_1$ of curve 3P is passed through gate 38. The voltage $e_1$ is the voltage of the peak of the first saw-tooth in curve 3E. During the time $t_1$ of curve 3V voltage $e_1$ is passed through gate 38. The output voltage in junction means 69 then during that period is illustrated in curve 3AA with that portion of the curve being indicated by amplitude $e_1$ and duration $t_1$.

The time $t_1$ occurs in time after the zero crossing 2 which is the end of the time between the zero crossings 1 and 2; as $t_1$ is delayed, as herein described, the value $e_1$ of the first saw-tooth signal in 3E can be held the entire time $t_1$. This process is repeated and a curve illustrated in 3AA is produced. It is thus seen that the curve illustrated 3AA is a series of voltage levels with the amplitude and the duration of each level being proportional to the time between its corresponding zero crossings of the seismic signal illustrated in curve 3A.

By observing curves 3V through 3Z, it will be observed that only one gate is passing a signal at any one time; however, it is also observed that as soon as one gate stops passing the voltage therethrough, the next succeeding gate is opened. Therefore, at any one time one gate will be passing a voltage therethrough.

The signal illustrated in curve 3AA may then be displayed as desired such as a color display mechanism shown in FIG. 4 and heretofore described.

To momentarily summarize, the measure of the time between two successive zero crossings of a seismic signal is made and saved. A linearly rising voltage ramp rising from zero is generated between each successive zero crossing. The maximum value of this voltage ramp is sampled and held. The voltage thus held is passed through gating means for a period of time equal to the time between zero crossings which has been measured and saved. This process is repeated between each zero crossing. The voltage thus passed through the gates is a series of substantially rectangular waveforms which has a series of voltage levels with each level having an amplitude and a duration proportional to the distance between the corresponding zero crossings which it represents. It is also noted that other points may be used in place of the zero crossing such as positive zero crossing, the negative zero crossing, the peaks or the valleys.

The most common occurring frequencies in seismic signals are from about 10 to 100 cycles per second. However, it is in the range from about 25 to 80 cycles per second in which frequency information is normally of the greatest interest. It is of course understood that the frequency range of interest may vary from area to area. For example, the various electronic components including color wedge 74 and mirror galvanometer 80 may be so designed that a frequency of about 65 to 80 cycles per second will give a color of red; a frequency of between 50 and 65, blue; a frequency of between 35 and 50 will give a color of yellow; a frequency of between about 25 and 35 will give a color of green. Of course by varying color wedge 74 and the rotational characteristics of the galvanometer any desired frequency and color combination may be obtained. In the system described in FIG. 4 there may be some blending of colors; however, this feature is not undesirable, in fact, it may even aid in the presentation. It is also to be noted that the curve illustrated in FIG. 3AA may be displayed in variable density by replacing the color wedge 74 of FIG. 4 with a light intensity wedge; that is, a wedge which on one end passes all the light through and on the other end stops all the light with varying degrees of light passage therebetween.

It is seen that a seismic section presented in variable density or variable color form may be prepared by using this invention. Individual signals, presented in a variable density or variable color form, are commonly arranged in the same lateral order as the geophone locations corresponding to the seismic signals. The spacing between the variable density presentation of the seismic signals are preferably proportional to the distance between the geophone locations so as to render the final products a reasonably accurate map of a vertical cross section of the portion of the earth under study. If the spacing between the center of the variable density presentation of the signal is increased, the width of the presentation is accordingly increased. This prevents blank spaces from appearing on the seismic section. It is thus clear that the seismic section can be prepared in a manner such that frequency variations within the seismic spectrum are readily detectable.

It will be understood that the apparatus and system contained in the above description are merely representative and illustrative and not limitive and that numerous modifications may be made therein without departing from the scope of the invention.

What is claimed is:

1. An apparatus for recording a seismic signal having zero crossings of voltages with respect to time about a zero reference line which comprises: means for detecting said zero crossing, means for generating a rectangular signal having different amplitude levels in which the amplitude and duration of each level of such rectangular signal is representative of the time between corresponding two successive zero crossings.

2. A system of recording a seismic signal which oscillates by a zero voltage line having significant points which comprises: means for detecting said significant points; means for measuring the time between significant points thus detected; and means for generating a rectangular signal responsive to the time thus measured in which each level has an amplitude and a duration indicative of its corresponding interval between successive significant points.

3. A system of recording a seismic signal having zero crossings of voltages with respect to time about a zero reference line which comprises: means for detecting said zero crossings; means for generating a constant linearly rising ramp waveform which is reset to zero at each said zero crossing; means for measuring the time between said zero crossings, means for sampling the maximum value of each ramp of said ramp waveform, and means for generating a second waveform in which the sampled value is held for the measured time.

4. A system for analyzing a seismic signal having zero crossings of voltages with respect to time about a zero reference line which comprises: detecting means for determining zero crossings; measuring means responsive to said detecting means to measure and save the time between said zero crossings thus detected; and means for generating a rectangular waveform so that each voltage level of said rectangular signal has a voltage and a duration proportional to the time between zero crossings thus measured by said measuring means.

5. A system for presenting seismic signals which oscillate by a zero voltage line thus having zero crossings which comprises: measuring means to measure the individual time between said zero crossings; means to store and save the time measured by said measuring means; means to generate a constant linearly rising voltage ramp waveform which is reset to zero by each said zero crossing; means to sample and hold the maximum value of each ramp of said saw-tooth waveform; and means to generate a waveform so that each sampled voltage is held for a measured time.

6. An apparatus for recording electrical signals oscillating by a zero voltage base line having time between zero crossings of said zero base line which comprises in combination: a zero crossing detector of a character to emit a sharp spike for each zero crossing; a counter electrically connected to the output of said zero crossing detector and having N outlets, such outlets being of a character to sequentially pass the spikes from said zero crossing detector with each outlet passing each N'th spike; a first set of N monostable multivibrators individually electrically connected to each said output of said counter, each said multivibrator having a positive and a negative pulse emitted simultaneously and of equal duration and magnitude when receiving a spike from its respective counter; a multivibrator electrically connected to the output of said zero crossing detector and having a pulse emitted for each spike from said zero crossing picker, the duration of said pulse being substantially equal to the duration of the pulse of each of said first set of monostable multivibrators; means to generate a sharp spike for the trailing edge of the negative pulse from said single multivibrator; a saw-tooth generator electrically connected to the output of said means and of a character to generate a waveform having a constant linearly rising voltage ramp which is reset to zero upon receiving each said spike; N sample-and-hold circuits electrically connected in parallel to the output of said saw-tooth generator, each said sample-and-hold circuit being electrically connected individually and sequentially to the output of one of said first set of N monostable multivibrators, said sample-and-hold circuit being of a character to sample the voltage of the output of said saw-tooth generator and hold such voltage upon receiving an output pulse from said monostable multivibrators; N gate means electrically connected individually to each said sample-and-hold circuit, N delay multivibrators electrically connected individually to each said output of said counter, each delay multivibrator having a positive and a negative pulse emitted simultaneously and of equal duration upon receiving a spike from its respective counter output; N adding means for adding the negative output of one delay multivibrator to the positive output of the next succeeding delay multivibrator to the positive output of the next succeeding delay multivibrator in sequence; the adding means for the negative output of the first of the series of delay multivibrators and the positive output of the second delay multivibrator being connected to the second gate means and the other adding means sequentially connected to the other gate means; connecting means for connecting individually each said adding means sequentially to one of said gates, said gate being of a character to pass therethrough said sampled-and-held voltage when the voltage added by said adding means reaches a predetermined level; and means to collect and record the voltages thus passed through said gates.

7. A system for presenting seismic signals having zero crossings of voltages with respect to time about a zero reference line which comprises: detecting means for detecting zero crossings; measuring means actuated by said detecting means to measure the individual time between the detected zero crossings; storing means to save the time measured by said measuring means; means to generate a saw-tooth waveform which is reset to zero by each said zero crossing detected by said detecting means; means to sample and hold the maximum value of each peak of said saw-tooth waveform; means to generate a rectangular waveform in which the voltage sampled by said sampling means is held for a time measured by said measuring means and saved by said storing means; and means to record said rectangular waveform.

8. A system as defined in claim 7 in which said means to record comprises display means in which said rectangular waveform is displayed in color such that different colors represent different voltage levels.

9. A system for recording on a recording medium a seismic signal which has variable time intervals between detectable significant points which comprises: detecting means of a character to emit a signal upon detecting the occurrence of such significant points; measuring means actuated by said detecting means to measure the time between the significant points indicated by the signals of said detetcing means; storing means to save the time measured by said measuring means; and generating means for generating a rectangular waveform having different levels in which each level has an amplitude and a duration proportional to the individual time stored by said storing means representative of the time between successive significant points.

References Cited in the file of this patent

UNITED STATES PATENTS

| | | |
|---|---|---|
| 2,195,855 | Fitch | Apr. 2, 1940 |
| 2,719,226 | Gordon et al. | Sept. 27, 1955 |
| 2,726,131 | Skelton | Dec. 6, 1955 |
| 2,929,928 | Hodder | Mar. 22, 1960 |
| 2,930,669 | Lickbider | Mar. 29, 1960 |